(12) United States Patent
Blase

(10) Patent No.: US 7,718,894 B2
(45) Date of Patent: May 18, 2010

(54) LINE GUIDE DEVICE

(75) Inventor: Frank Blase, Bergisch Gladbach (DE)

(73) Assignee: Igus GmbH, Cologne (DE)

( * ) Notice: Subject to any disclaimer, the term of this patent is extended or adjusted under 35 U.S.C. 154(b) by 678 days.

(21) Appl. No.: 10/576,234

(22) PCT Filed: Oct. 10, 2004

(86) PCT No.: PCT/DE2004/002291

§ 371 (c)(1),
(2), (4) Date: May 9, 2007

(87) PCT Pub. No.: WO2005/040659

PCT Pub. Date: May 6, 2005

(65) Prior Publication Data

US 2007/0289767 A1 Dec. 20, 2007

(30) Foreign Application Priority Data

Oct. 15, 2003 (DE) .............................. 203 16 068 U
Apr. 8, 2004 (DE) ................... 20 2004 005 848 U

(51) Int. Cl.
    *H02G 3/04* (2006.01)
(52) U.S. Cl. ..................... 174/68.1; 174/68.3; 174/481; 248/49; 248/51; 385/135
(58) Field of Classification Search ................ 174/480, 174/481, 68.1, 68.3, 19, 95, 97, 101, 135, 174/69, 88; 249/49, 51, 75; 59/78.1, 83, 59/85; 254/134.3 R, 134.3 FT; 385/134, 385/135
See application file for complete search history.

(56) References Cited

U.S. PATENT DOCUMENTS 5,322,480 A  6/1994 Meier et al.

(Continued)

FOREIGN PATENT DOCUMENTS

DE          3613431          10/1987

(Continued)

OTHER PUBLICATIONS

German Search Report dated Feb. 6, 2007 received in corresponding German Patent Application Serial No. 20 2004 005 848.0 (4 pages).

*Primary Examiner*—Angel R Estrada
(74) *Attorney, Agent, or Firm*—Grossman Tucker Perreault & Pfleger, PLLC

(57) ABSTRACT

A line guide device for guiding lines can comprise a plurality of links, connected to each other in articulated fashion, where at least some, or all, of the links each display a bottom element, opposite side walls and at least one cover element, the plurality of links are integrally moulded on one another in one piece, forming a continuous strand, and the line guide device can be arranged to form a lower run, a curved section and an upper run. For the purpose of low-cost manufacture and versatile utility with comparatively small cross-sections of the links, it is proposed that the bottom element (3) and both opposite side walls (4) of the links are designed in one piece as essentially rigid U-sections, and the cover element (5*a*, 5*b*) of the respective link is integrally moulded on at least one side wall (4) of said link and designed to be moveable, and can be moved into a position closing the link and a position releasing it.

19 Claims, 11 Drawing Sheets

U.S. PATENT DOCUMENTS

Figure 1:
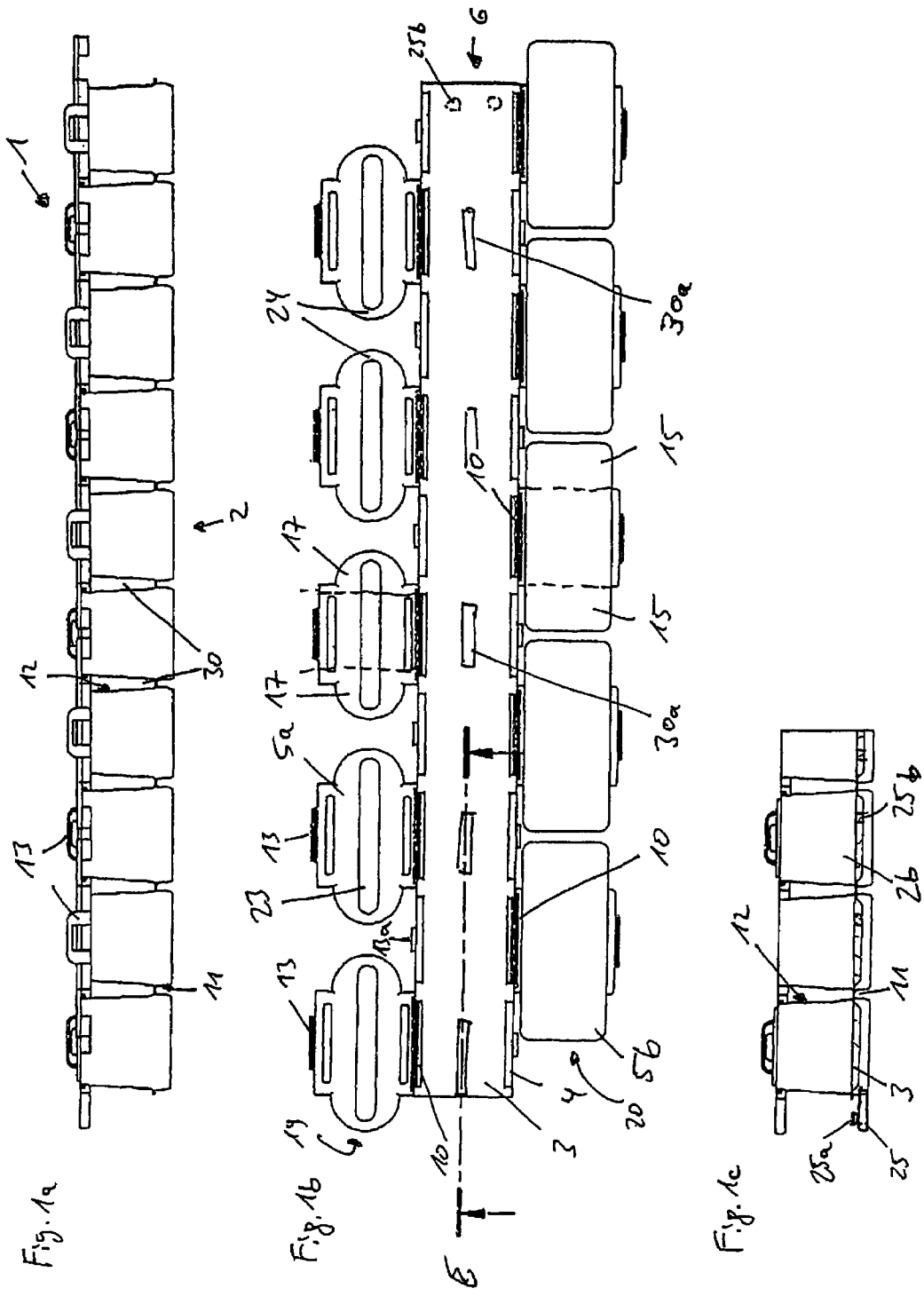

| | | | |
|---|---|---|---|
| 5,638,672 A * | 6/1997 | Furukawa | 59/78.1 |
| 5,836,148 A * | 11/1998 | Fukao | 59/78.1 |
| 6,107,565 A * | 8/2000 | O'Rourke | 174/101 |
| 6,161,373 A | 12/2000 | Heidrich et al. | |
| 6,354,070 B1 | 3/2002 | Blase | |
| 6,459,037 B2 | 10/2002 | Muller et al. | |
| 6,615,573 B2 * | 9/2003 | Blase | 59/78.1 |
| 6,940,019 B2 * | 9/2005 | Ikeda et al. | 174/68.3 |
| 7,047,720 B2 * | 5/2006 | Ikeda et al. | 59/78.1 |
| 7,417,188 B2 * | 8/2008 | McNutt et al. | 174/68.1 |
| 7,426,823 B2 * | 9/2008 | Blase et al. | 59/78.1 |

FOREIGN PATENT DOCUMENTS

| | | |
|---|---|---|
| DE | 4120481 | 1/1993 |
| DE | 19840012 | 4/2000 |
| EP | 1138555 | 10/2001 |

* cited by examiner

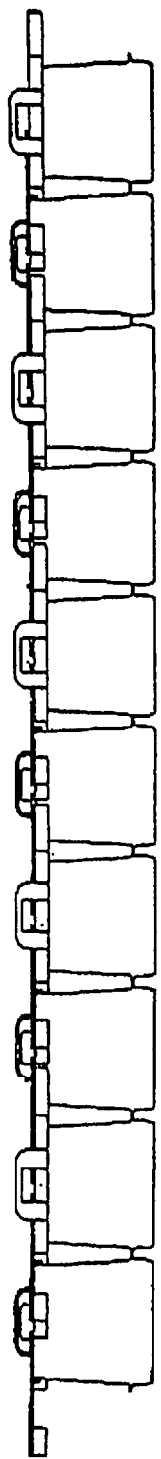
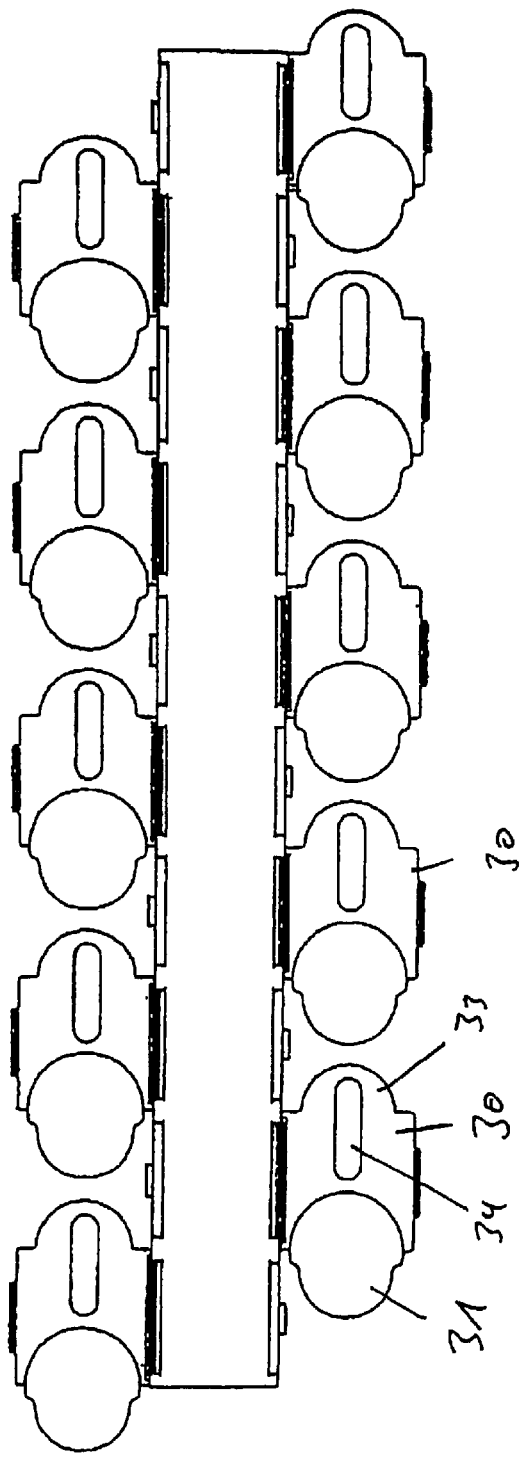
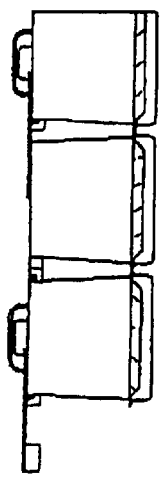
Fig. 4a
Fig. 4b
Fig. 4c

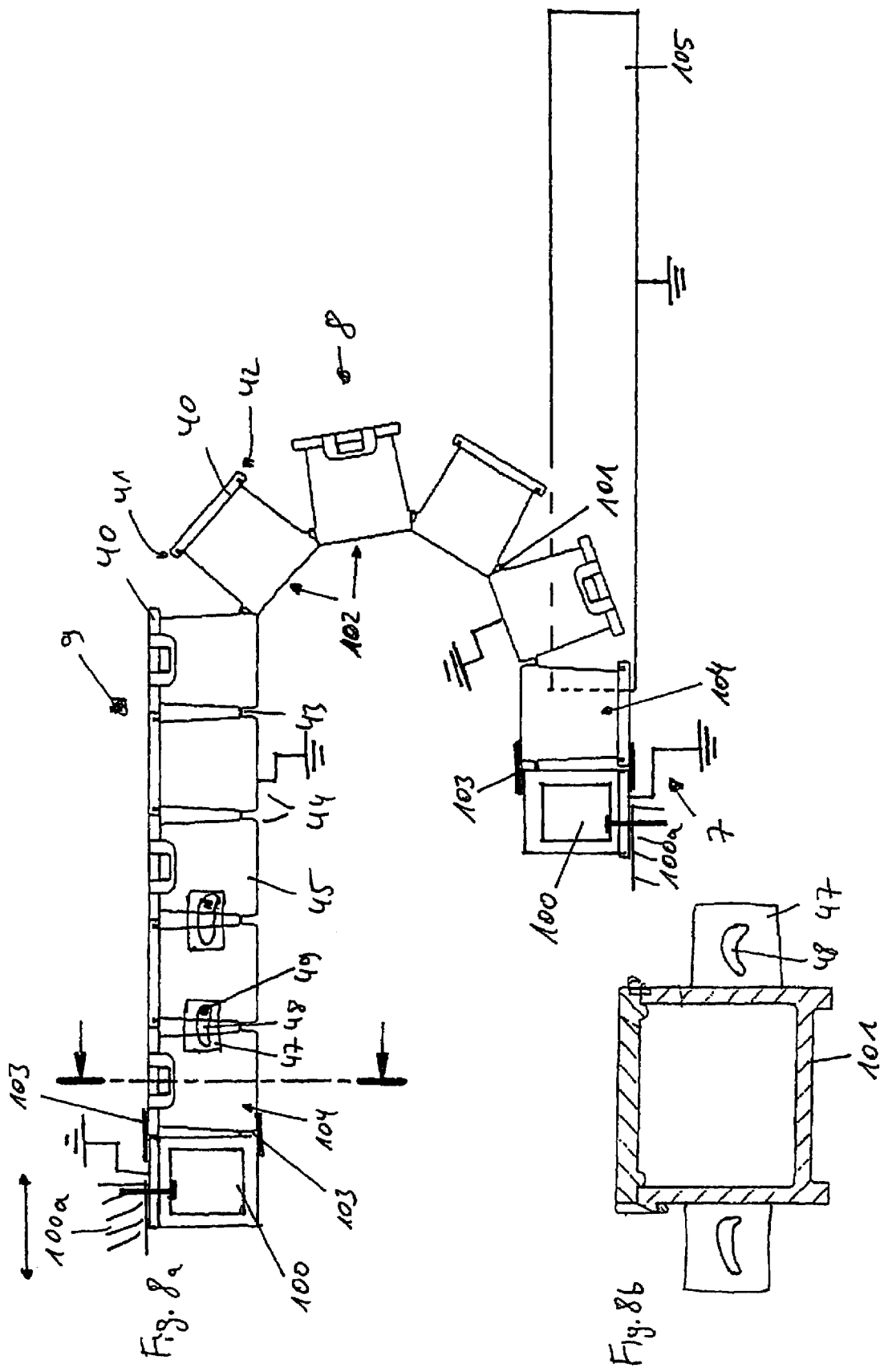

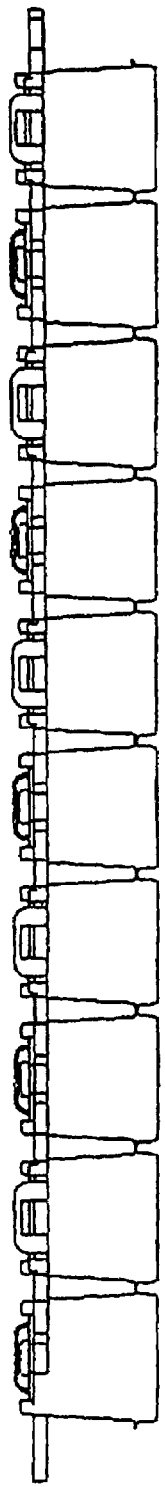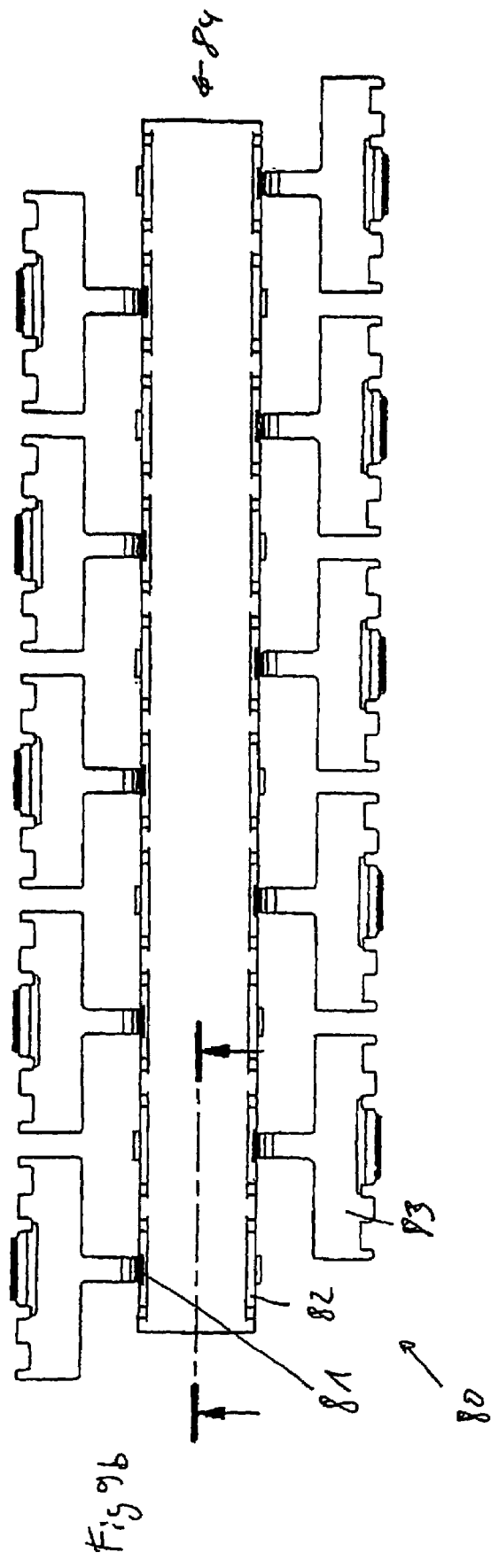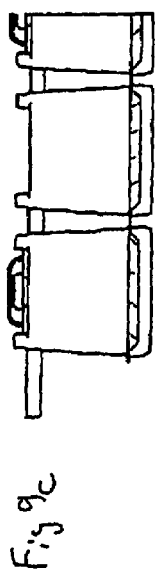
Fig 9a
Fig 9b
Fig 9c

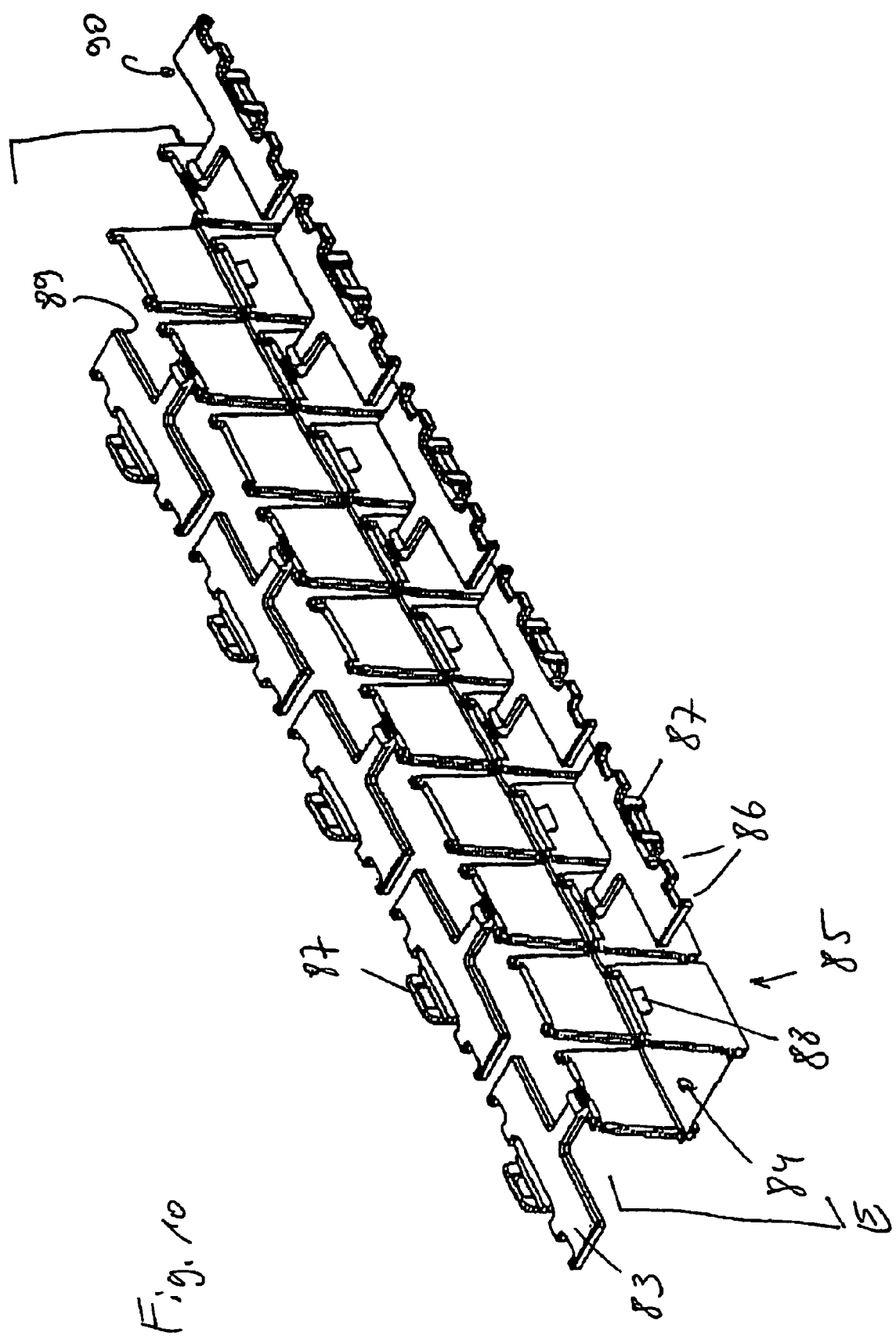

LINE GUIDE DEVICE

The invention relates to a line guide device for guiding lines, comprising a plurality of links connected to each other in articulated fashion, each of which displays a bottom element, opposite side walls and at least one cover element, forming a duct for accommodating lines, where the plurality of links are integrally moulded on one another in one piece, forming a continuous strand, where the line guide device can be arranged to form a lower run, a curved section and an upper run, and where the bottom element and both opposite side walls of the links are designed in one piece as U-sections that are essentially rigid under the intended loads, and where the cover element of the respective link is integrally moulded on at least one side wall of said link and designed to be moveable relative to the side wall, and can be moved into a position closing the link and a position at least essentially releasing the area between the opposite side walls.

Line guide devices of one-piece design of this kind that extend over a plurality of links connected to each other in articulated fashion are often manufactured as extruded sections, where the side walls of the extruded section are machined in order to form the individual links, e.g. by making notches. Line guide devices of this kind are usually relatively flexible, partly in order to permit easy arrangement of the lines to be guided in the duct of the line guide device. On the other hand, however, this results in relatively low stability of the links, especially in the event of torsional stress or laterally acting forces. Furthermore, complex structuring of the links of the extruded sections involves a great effort, or is completely impossible, meaning that there are limits to the adaptation of the line guide device to different requirements or other functions.

Furthermore, line guide devices have become known that are made of plastic and injection-moulded in one piece, essentially in a roughly plane arrangement. The bottom element, the side walls and the cover element are in this case each connected to each other by joint elements in the manner of film hinges. While this permits manufacture of a line guide device at low cost, the line guide device is, however, comparatively unstable on the whole when exposed to external forces, which are also exerted on the line guide device during travel motion thereof, meaning that it is not suitable for all applications. This particularly applies in cases where the line guide device only has a cross-section of very small dimensions, this being necessary for many applications, e.g. in the automotive sector, for printers or the like.

EP 1 138 555 B1 describes a device for carrying and guiding a bundle of wires that is firmly connected to a part, such as the seat part of a front seat for motor vehicles, and moveable relative to a carrier, and which contains a flexible, curved belt in the form of a trough for accommodating the bundle of wires, which is located below the moveable part in a plane running approximately perpendicular to the carrier, and the lower end of which is firmly connected to a supporting plate, which can be fastened to the carrier, where fastening means for enclosing the bundle of wires in the trough-shaped belt are provided, such that the bundle of wires and the belt are deformable in at least two orthogonal directions running perpendicular to the carrier and parallel to it.

The object of the invention is therefore to provide a line guide device that can be manufactured at low cost and used for a wide variety of purposes, even with relatively small cross-sections of the links.

The object is solved by a line guide device according to the present invention. The links are thus manufactured as essentially rigid U-sections, which are present in a one-piece strand of the line guide device, such that the line guide device displays high stability even if the links are relatively small. Owing to the high stability of the links and their being integrally moulded on one another in one piece, even a line guide device with a very small link cross-section can display very quiet running and uniform movement. In this context, the links of the line guide device can have a width and/or height of ≦2 cm, ≦1.5 cm or ≦0.5-1 cm. It thus goes without saying that the U-sections of the links, which are essentially rigid under the intended loads, can nevertheless be deformable to at least a certain degree, if appropriate, either manually or under elevated loads. On the other hand, with such small links, closing element can, in particular, be designed as a tab that can be fixed in place by a snap fit.

Adjacent links are provided with stops that correspond to each other and can come into contact with each other when the line guide device is in the straight position. In this context, the line guide device can be in essentially linear, straight position and display a certain degree of pretension, such that a straight position is only obtained when a pressure load is exerted on the upper side of the bottom elements, e.g. by lines arranged in the line guide device. The face ends of the side walls of the links that face the adjacent link often serve as stop faces. This is, however, sometimes not expedient in the case of links with a relatively small cross-section and thus a small width of the side walls. Consequently, at least one of the corresponding stops of adjacent links is preferably provided on a cover element; A corresponding stop of the adjacent link can, for example, likewise be located on a cover element, or on an inner side, outer side and/or an upper side of the side wall facing away from the bottom element of the link. The line guide device can in each case be designed in such a way that the upper run can be deposited on the lower run, or that the upper run is suspended freely.

The cover elements can, for example, display projections that reach over the adjacent link and act on an upper side of a side wall of an adjacent link, forming a stop, e.g. engage a recess in the side wall that is open towards the top. The stops on the cover element can essentially display the width of the side walls of the adjacent link or, if appropriate, the side walls can display areas with a wider cross-section that serve as stops.

According to the invention, the respectively corresponding stops of adjacent links, which act in the straight position and/or curved position of the line guide device and, in this context, limit the pivoting position of the links in the respective direction, are in each case located on both cover elements of the respectively adjacent links. Integral moulding of the stops on the side walls is no longer necessary as a result. Furthermore, the stops can be located roughly, or exactly, at the level of the longitudinal mid-plane of the line guide device, i.e. at an at least roughly, or exactly, equal distance from the respectively opposite side walls of a link, as a result of which the stops display a relatively large stop face and their central position on the line guide device avoids non-uniform contact behaviour of laterally separated pairs of stops.

The stop is preferably designed as an area projecting from the respective cover element, which, in straight position of the line guide device, projects onto the adjacent link and, in stop position, engages a recess provided with a stop in a cover element and/or a side wall of the adjacent link. One stop of a pair of stops of adjacent links that acts in straight position can be provided by a recess in the respective cover element that is open towards the adjacent link, where the recess is preferably designed to be at least partly, or completely, closed in the direction of the bottom element of the respective link. In stop position, this prevents the stop of the adjacent link from slipping off towards the bottom element of the link. If appropriate, the recess in the cover element that accommodates the stop of the adjacent link can also be designed to be at least partly, or completely, closed towards the top.

According to the invention, the side walls and/or cover elements of at least some, or all, links are alternatively or additionally provided with tabs integrally moulded in one piece, which, starting from a first position corresponding, for example, to the position of the tab in the respective mould, e.g. an injection mould, by means of which the line guide device is manufactured, can be moved into a second position, in which they overlap a partial area of an adjacent link. This makes it possible to provide overlapping areas of adjacent links without having to produce overlapping areas of the links during manufacture of the line guide device in a mould, such as an injection mould, this usually being a highly complex task in terms of mould design. The overlapping areas can, for example, each provide one stop of a pair of stops of adjacent links that acts in the straight position and/or the maximally curved position of the line guide device.

In the area of the essentially rigid side walls and the bottom elements, the links preferably display no overlapping areas, apart from the aforementioned moveable tabs, where appropriate.

The one-piece section of the line guide device, displaying a plurality of links, is preferably moulded in such a way that the cover elements are in each case alternately integrally moulded on opposite side walls of the links.

At least some, or all, cover elements of the links are preferably provided with at least one integrally moulded tab-like area, which forms overlapping areas with at least one of the respectively adjacent links in the straight and/or maximally curved position of the line guide device, where stop elements acting in the respective stop position are located on the overlapping areas of the respectively adjacent links. In particular, some or all cover elements of the links can each have two integrally moulded tab-like areas, each of which projects onto one of the two adjacent links, forming overlapping areas with them. The tab-like areas thus border on the cover elements at the level of the hinge joints, such that the cover elements display a greater extension in the longitudinal direction of the line guide device at the level of the tabs than at the level of the hinge joints to the side walls. The interacting pairs of stops of adjacent links can thus be located on a tab projecting from a cover element of a first link and a corresponding projecting tab of a second link, as a result of which pairs of stops can be provided that act in the curved position of the line guide device, in particular. It is also possible for a tab-like area projecting from a cover element to be provided, which overlaps an area of the cover element of the adjacent link that is located at the level of the corresponding hinge joint. Pairs of stops of respectively adjacent links, acting particularly in the straight position of the line guide device, can be located on the two such overlapping areas.

The tabs described above can display the same flexural strength in the longitudinal direction of the line guide device as the cover elements themselves, although the tabs preferably display greater flexural strength, such that the line guide device can more easily be moved into a curved position, forming a curved section connecting the upper run and the lower run. Of the respectively overlapping areas of adjacent cover elements, one area can display high flexural strength, while the other, preferably the area facing the bottom elements, displays low flexural strength.

Particularly the face ends of the tabs located on the cover elements that face towards the adjacent link, or the face ends of the cover elements themselves, can act as stops in the straight position of the line guide device.

Preferably provided as stops in the curved position of the line guide device are pegs, integrally moulded on the cover elements and/or on the projecting areas or tabs facing towards the adjacent link, said pegs extending essentially transverse, preferably perpendicular, to the longitudinal direction of the line guide device and engaging corresponding recesses in the cover elements of the adjacent link, or in the projecting areas or tabs integrally moulded on them. The pegs can be arranged transverse or essentially perpendicular to the bottom elements of the links.

Pegs of this kind can particularly be designed as snap fasteners, such that the pegs are prevented from jumping out of the receptacles of the adjacent link even in the event of flexural loading of the tabs.

The respectively adjacent links in the straight position of the side walls can be spaced apart from each other, at least over part, or all, of their height, the height extending from a bottom element to the cover element. An arrangement of this kind is expedient for forming further stops or for forming film hinges for articulated connection of the links, especially if the line guide device is designed as an injection moulding. The width of gaps of this kind between adjacent links in the longitudinal direction of the line guide device can be greater than/equal to half, once or twice the side wall thickness of the respective links.

To provide an additional or alternative pair of stops on adjacent links to limit the pivoting angle in the curved position of the line guide device, the bottom element and/or the side wall of at least one, or both, of the adjacent links can be provided with a protruding projection, which projects onto the respectively adjacent link and, in curved position, can be brought into contact with the corresponding stop of the adjacent link. The projecting area and/or the corresponding stop area is preferably bevelled, forming a plane stop. By providing this stop, the hinge joints of the links connected to each other in one piece can be relieved of load when contacting each other, in addition to which an exactly defined arrangement of the line guide device in curved position can be provided.

Dividing webs integrally moulded in one piece can be provided on the links, serving as partitions for the interior of the duct of the line guide device formed between the opposite side walls of the link. In particular, these dividing webs can, like the side walls, be integrally moulded in one piece on the bottom element of the respective link in essentially rigid and bending-resistant manner. It is, of course, also possible to provide several, laterally separated dividing walls for partitioning the interior of the line guide device. Where appropriate, the dividing walls can run up against the cover elements, or connecting means can be provided for detachable connection of the dividing webs to the cover elements.

The cover elements are preferably designed in such a way that they provide a line guide device that is essentially closed on the upper side. In particular, the line guide device can be designed to be completely closed on the upper side when in the straight position.

For fastening several line guide devices manufactured in one piece to each other or to another device, fastening elements corresponding to each other can be integrally moulded in one piece on the ends of the line guide device, such that two line guide devices of identical design can be assembled at the face end, i.e. to extend the length of the same.

Preferably, at least one female, preferably male, fastening element is provided on one end of the line guide device, and a corresponding male or female fastening element is provided on several, i.e. at least two, or all links of the line guide device. In particular, the fastening elements can, in this context, be provided in a regular sequence on the line guide device, e.g. on every second, every third or every fourth link. In this way, the length of the line guide device can be altered by separating adjacent links, in which context a fastening element is always provided at the end for connection to a line guide device of identical design. Preferably, a male fastening element is provided on one end of the line guide device, corresponding female receptacles being provided on several or all other links. A web projecting in the longitudinal direction of the line guide device, or an extension of the bottom element, can be provided on the bottom element of an end link. as the male fastening element, from which one or more fastening pegs project that can be fixed in place in corresponding receptacles provided on the undersides of the bottom elements of the links.

The line guide device according to the invention preferably displays, over at least essentially the length of a continuous bottom element interconnecting several links, or over the-full length of the line guide device, an electrical resistance in the range from 6,000 to 20,000 ohms, preferably $\leq 10,000$ ohms or $\leq 6,900$ ohms, particularly preferably $\leq 4,000$ ohms. The electrical resistance indicated can exist over the full length of the line guide device, i.e. between the first and the last link of the line guide device, or between the end fastening elements or electrical connecting elements at the two ends of the line guide device with the stationary and the mobile consumers.

Alternatively, the electrical resistance in the range from 6,000 to 20,000 ohms, or preferably of $\leq 10,000$ ohms as more precisely specified above, between several links spaced apart in the longitudinal direction of the line guide device can also exist between two links that are each earthed by a suitable electrical, preferably metallic, discharge device or provided with a suitable earthing point or an earthing device. In the simplest case, the earthing device can be a connecting point designed for electrical connection of an electrical discharge device.

The links that are earthed, or provided with an earthing point or an earthing device, which can in each case be the closest links of corresponding design in the longitudinal direction of the line guide device, are preferably connected to each other by a continuous bottom element, although this is not always absolutely necessary.

The continuous bottom element can connect a plurality of links to each other in each case, or a plurality of links, e.g. 4, 10, 25 or 100 or more in each case, is arranged in each case between the links, or between the links that are earthed or provided with an earthing device, which are in each case preferably connected to each other by a continuous bottom element. Where appropriate, it is also possible for several line guide devices, each with a continuous bottom element, to be arranged one after the other and connected to each other to extend the length of the device, where the continuous bottom element in each case preferably extends over more than one-quarter or more than one-half of the length of the line guide device. In this context, each of the bottom elements is preferably equipped with at least one, or several, links that are earthed or provided with an earthing device, in order to be able to reliably prevent electrostatic charging of the line guide devices in the respective application, and discharge charge carriers. Bottom elements each connecting a plurality of links in the longitudinal direction of the line guide device can be connected to each other in electrically conductive fashion by a bridging contact in order to achieve the specified resistance values of preferably $\leq 20,000$ ohms or $\leq 10,000$ ohms, or other desired resistance values, such as surface resistances. In this context, the bridging element can constitute a separate component, which can be of rigid design, in order to connect the adjacent links to each other in non-pivoting fashion, or of flexible design, e.g. in the form of a flexible discharge wire or the like. The adjacent bottom elements can also overlap each other in this context.

The links that are earthed, or provided with earthing points or devices, are preferably distributed uniformly over the length of the line guide device.

In each of the above-mentioned embodiments, the continuous bottom element thus provides a continuous electrical conduction path that is not interrupted by any connecting areas of components.

Furthermore, the line guide device according to the invention can, over essentially the length of a continuous bottom element connecting several links to each other, display an electrical surface resistance $R_S$ and/or an end-to-end resistance $R_e$ and/or a point-to-point resistance $R_p$ of $\leq 1 \times 10^{10}$ ohms, where the resistance is preferably $\leq 1 \times 10^6$ ohms or $\leq 1 \times 10^4$ ohms, e.g. in the range from $1 \times 10^4 \leq R_p \leq 1 \times 10^{10}$ ohms. The resistance indicated can also be present over a distance in the longitudinal direction of the line guide device between two adjacent links that are earthed or provided with an earthing device, or also over the full length of the line guide device, particularly from end fastening element to end fastening element.

Additionally or alternatively, the line guide device according to the invention is designed such that, over essentially the length of a continuous bottom element connecting several links to each other, it displays an electrical resistance to EPA earth and/or to an earthing point $R_g$ of $\leq 1 \times 10^{12}$ ohms, preferably $\leq 1 \times 10^9$ ohms. The resistance indicated is preferably in the range from $7.5 \times 10^5 \leq R_g \leq 1 \times 10^9$ ohms. The resistance indicated can also be present over a distance in the longitudinal direction of the line guide device between two adjacent links that are earthed or provided with an earthing device and/or over the full length of the line guide device.

The number of links over which the indicated maximum resistances $R_S$, $R_p$ or $R_g$ are present can be 4, 10, 25 or 100 in each case, or more links in each case, or, in the event of several bottom elements connected one after the other, more than one-quarter or more than one-half of the length of the line guide device.

In this context, the line guide device is preferably designed as a plastic part, particularly-as an injection-moulded part. This kind of design of the line guide device enables it to comply with the requirements for an ESD protection element according to EN 61340-5-1 or a corresponding national or international standard. In this context, the line guide device can be used in areas in which the build-up of electrostatic charges in equipment is to be avoided, e.g. in the-production of electrical or electronic components, such as semiconductor elements, printed circuit boards and the like. The line guide devices can thus be advantageously used in machines for manufacturing components of this kind, or in machines for handling, e.g. transporting or packing, components of this kind. Furthermore, line guide devices of this kind can be used advantageously in explosion-protected areas.

The continuous bottom element of the line guide device preferably consists of a plastic material, particularly in the form of an injection moulding, where the side walls are integrally moulded in one piece. Where appropriate, the earthed links of the line guide device can partly or completely consist of metal, where a continuous bottom element is preferably located between these links, or a small number of sections of the line guide device, these being connected by bridging elements of high electrical conductivity. The bridging element is preferably designed in such a way that the electrical resistance across the bridging area is still acceptably, marginally or not higher than it would be in the case of a continuous bottom element. The resistance in the bridging area is preferably <100%, <50% or <20% or not higher than with a continuous bottom element. The adjacent ends of the bottom element can also overlap in the bridging area.

The earthed links can, in particular, be the end fastening elements or the links directly adjacent to them, although these links can also be separated from the end fastening elements by a plurality of other links, where appropriate. Furthermore, earthing of areas of the line guide device can be achieved by earthing various partial areas of a guide trough for the line guide device, or of elements thereof, e.g. of sliding rails on which the upper run of the line guide device can be deposited.

It goes without saying that the line guide device can meet all other requirements to DIN EN 61340-5-1, or corresponding national or international standards. In this context, the line guide device can, where appropriate, be taken as being a work surface pursuant to Table 1 of this European Standard. It goes without saying that the resistances mentioned can likewise be respectively determined according to this standard. Reference is made to Section 5.3 of EN 61340-5-1:2001 regarding the requirements for an EPA grounding device or an EPA ground terminal, to Section A.1 of EN 61340-5-1:2001 regarding the resistance measurement method for testing work surfaces, to Appendix A.1 of DIN standard IEC 1340-4-1 regarding the device for resistance measurements, and to DIN 53482 or DIN. IEC 60093 regarding the design of electrodes for measuring the respective resistances. All the above-mentioned standards are herewith included as references.

The line guide device according to the invention can be entirely made of a uniform material, although materials of different electrical conductivity can, where appropriate, also be used to manufacture the bottom element connecting several links to each other, on the one hand, and the opposite side walls and/or a cover element, on the other hand. In this context, the bottom element can, in particular, display higher electrical conductivity than the other areas mentioned.

In order to provide a material with sufficiently high electrical conductivity, the surface of the respective links, including the surface of the bottom element connecting several links to each other, which can in each case particularly be manufactured as plastic parts, can be provided with a conductive coating. A coating of this kind can be provided, for example, in the form of a graphite coating or a coating of a metallic or semiconducting material. Furthermore, as an alternative or in addition, volatile antistatic agents can be incorporated into the material of the line guide device, particularly in the area of the side walls and/or the bottom element. Particularly preferably, the material for manufacturing the line guide device intrinsically displays corresponding volume conductivity or surface conductivity in order to meet the above-mentioned conditions. To this end, the plastic material can, for example, be provided with corresponding fillers that increase the conductivity of the plastic material, such as carbon fibres, fibres of metallic or semiconducting materials, such as silicon, metallic or semiconducting powders, such as aluminium or silicon powder, or the like. Finally, discharge wires can be incorporated into the bottom element, also extending over several links or the entire line guide device. It goes without saying that the corresponding conductivity can also be created in some other suitable way.

Seen as a whole, it is thus possible to provide a line guide device for ESD protection zones (ESD: electrostatic-sensitive device) and/or for explosion-hazard areas.

Figure 2:
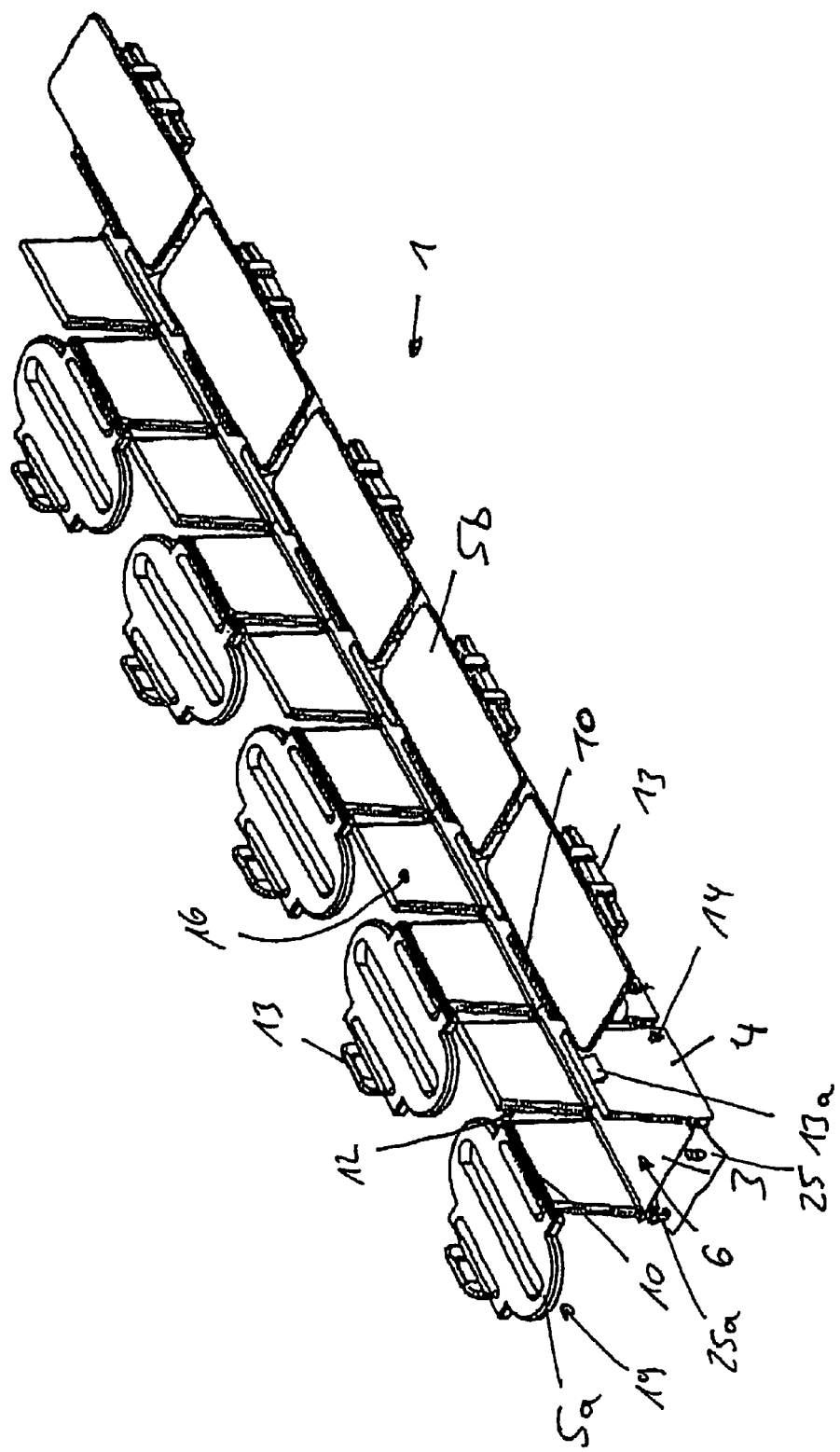
Figure 3:
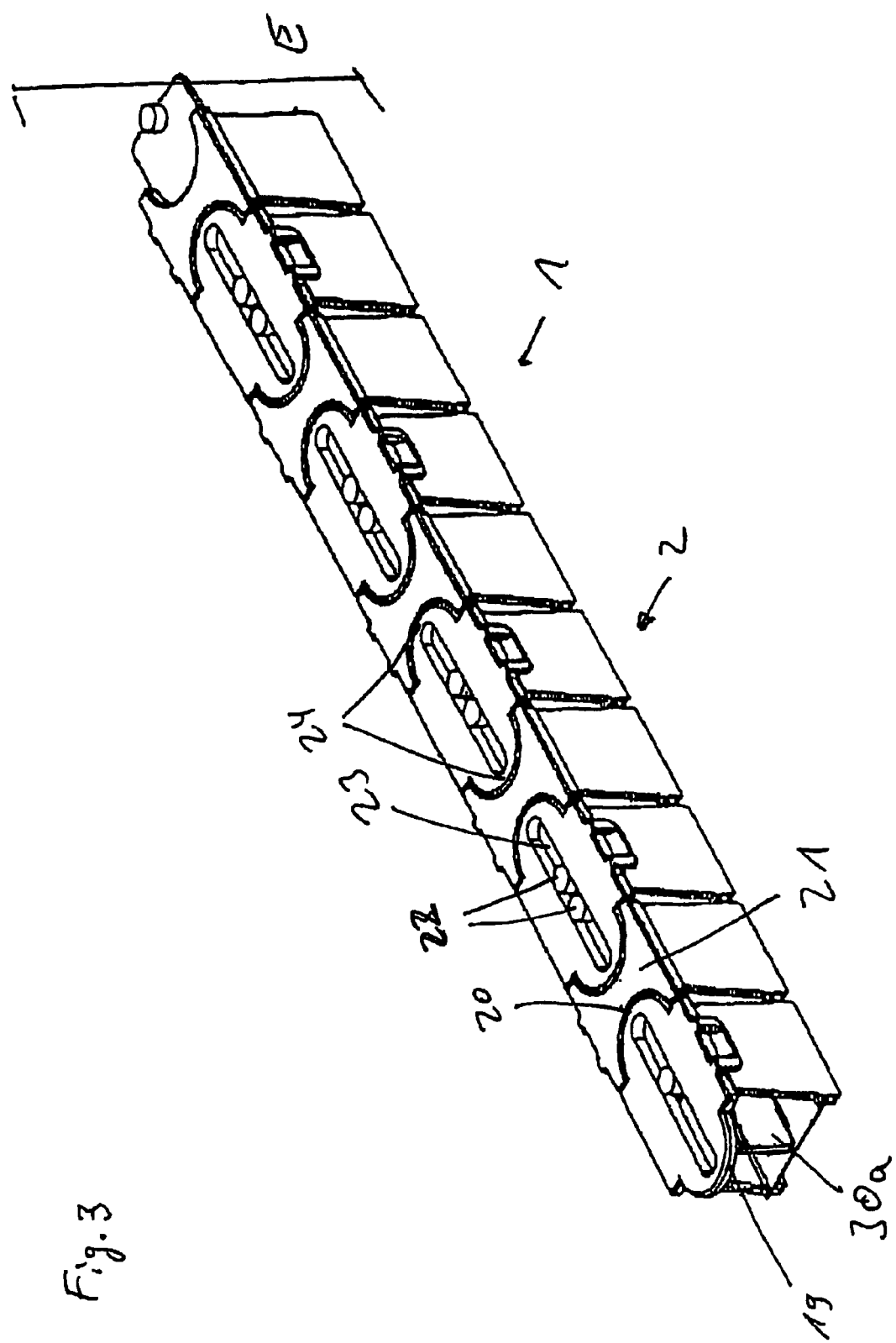
Figure 5:
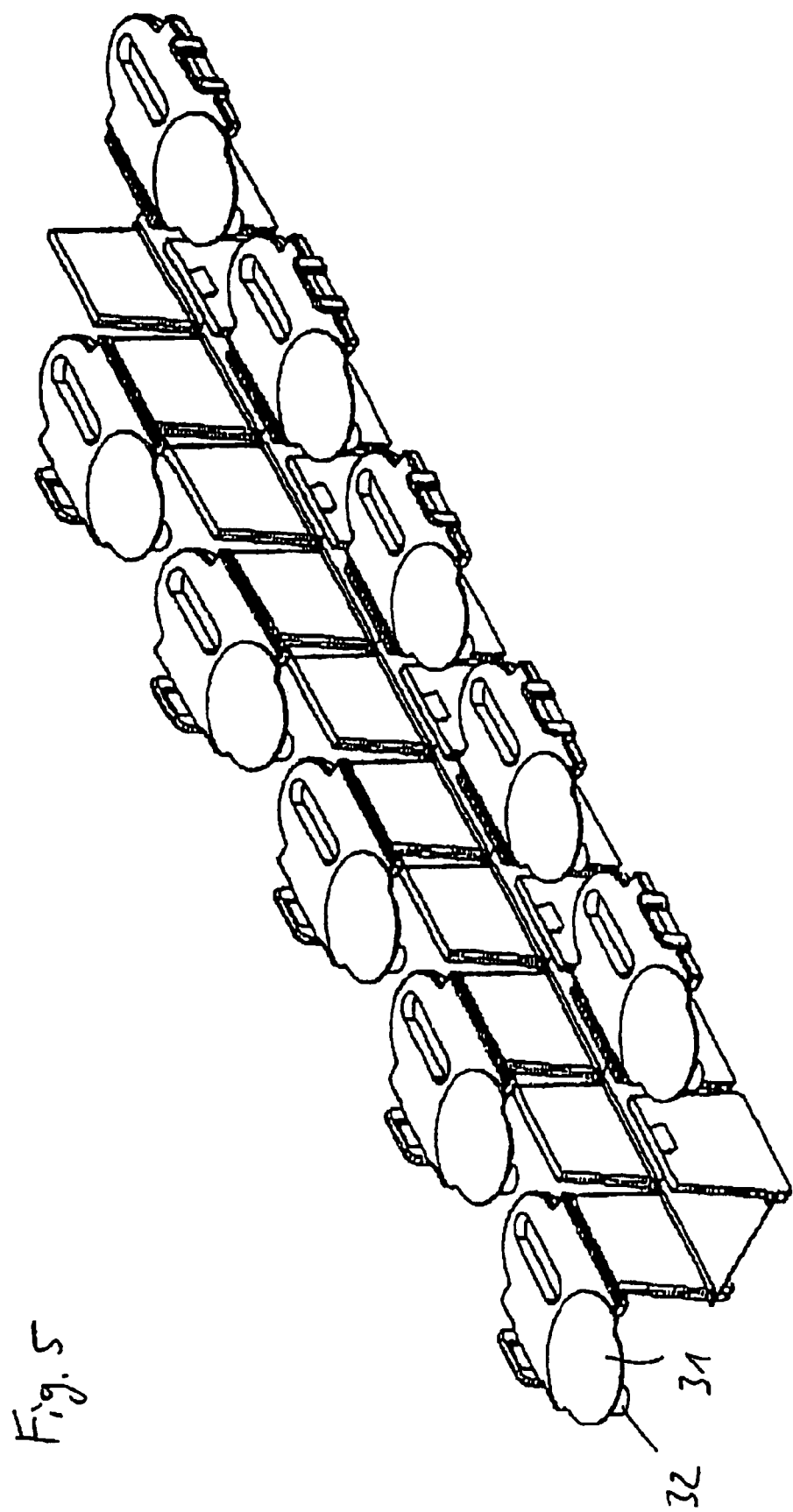
Figure 6:
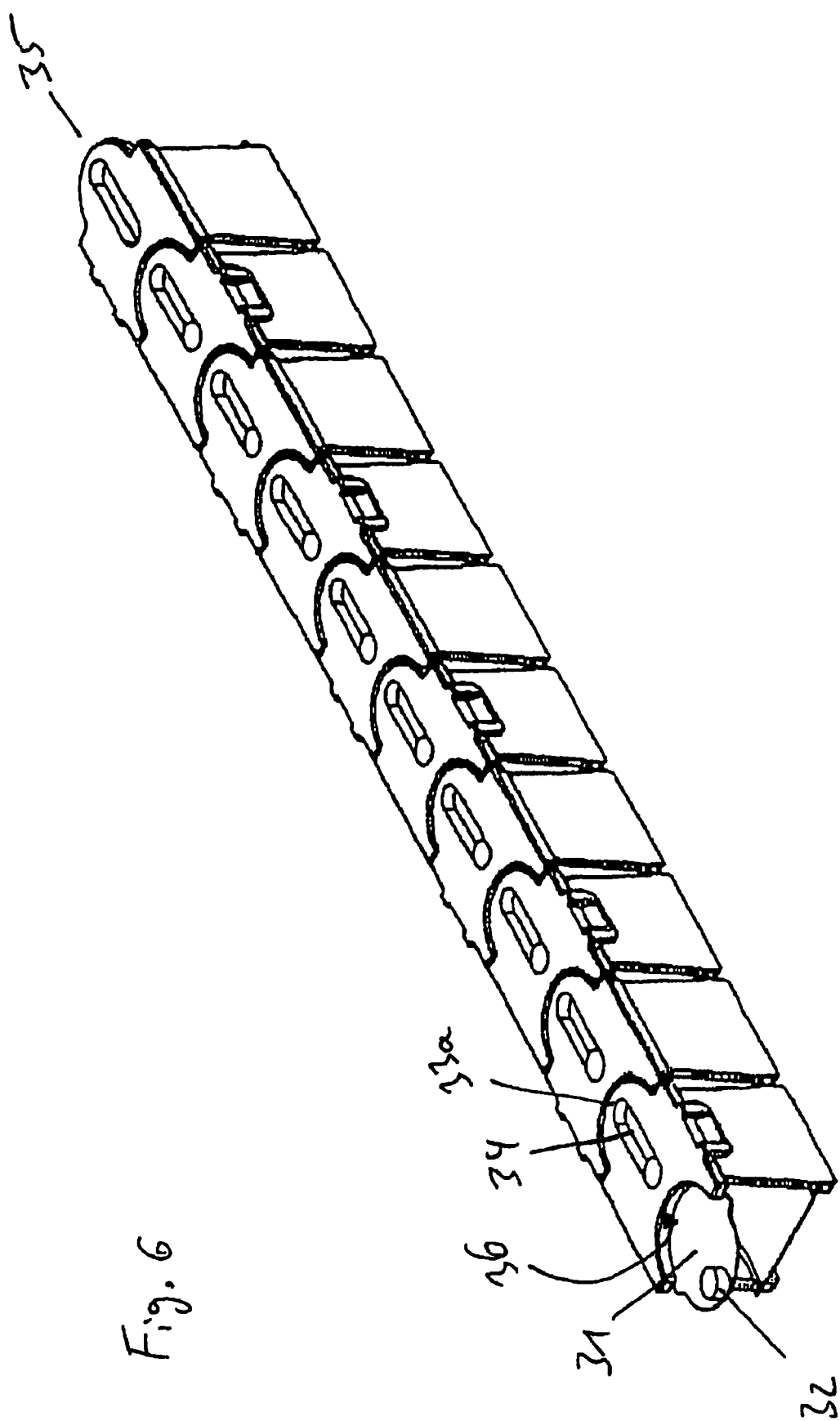
Figure 7:
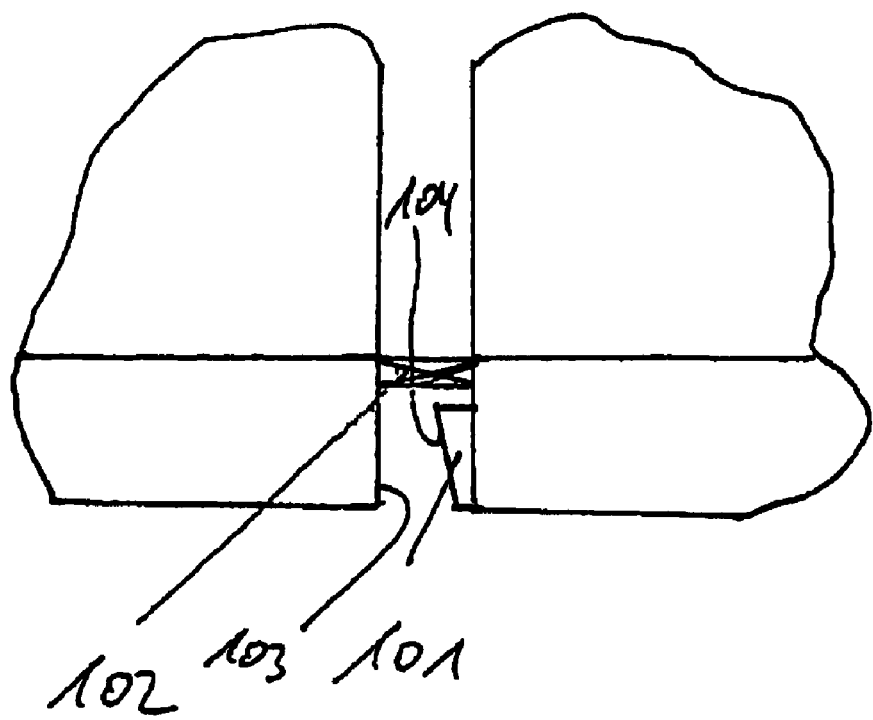
Figure 8C:
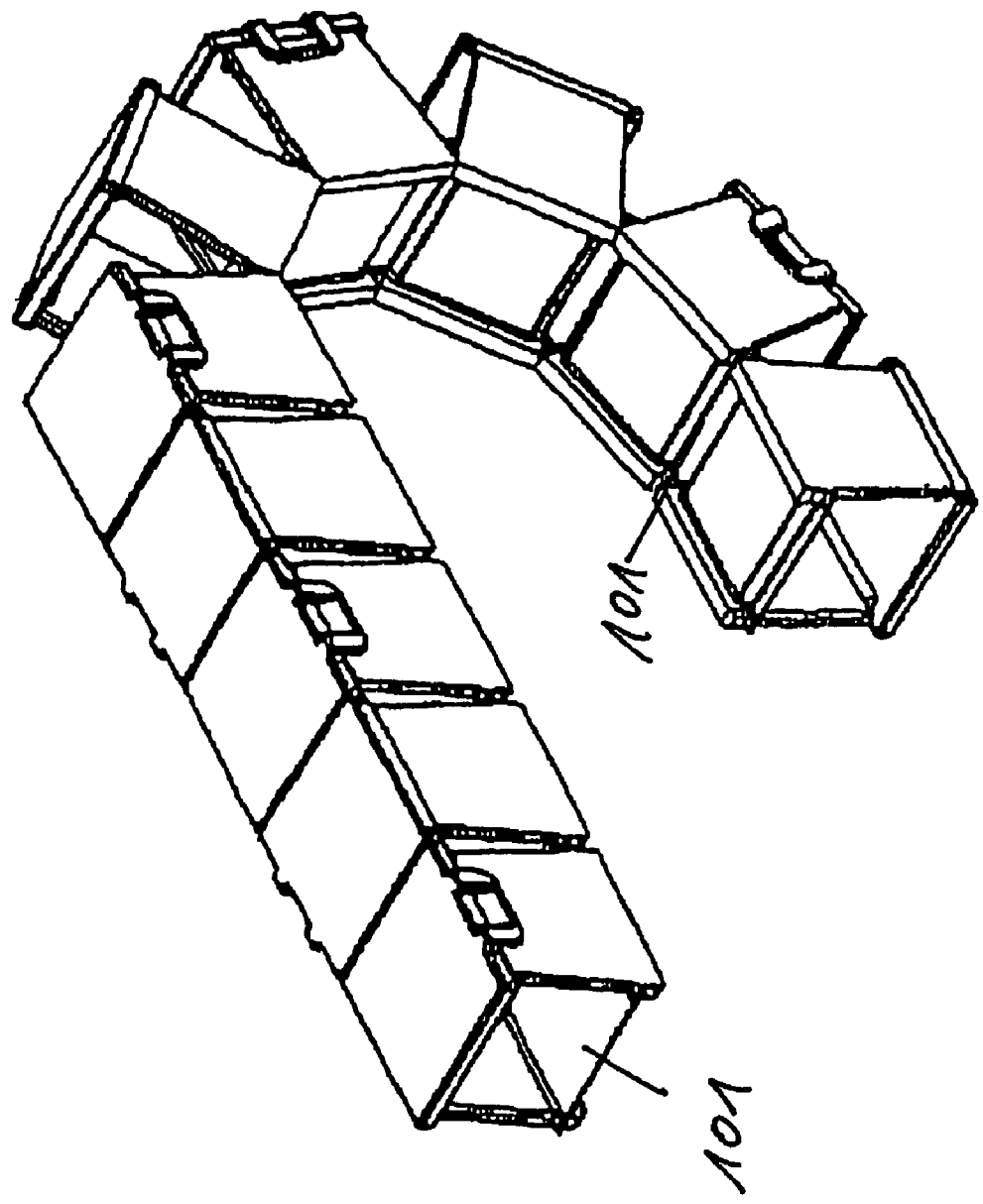

An example of the invention is described below and explained on the basis of the Figures. The Figures show the following:

FIGS. 1 to 3 Various views of a first line guide device according to the invention, with completely opened cover elements (FIGS. 1, 2) and completely closed cover elements (FIG. 3), FIGS. 4 to 6 A further embodiment of a line guide device according to the invention, with completely opened cover elements (FIGS. 4, 5) and completely closed cover elements (FIG. 6), FIG. 7 A schematic detail view of the transitional area between adjacent links, FIG. 8 A schematic arrangement of a further line guide device according to the invention, in curved position (FIG. 8*a*), as a cross-section (FIG. 8*b*) and in a perspective view (FIG. 8*c*), FIGS. 9 and 10 A further embodiment of a line guide device according to the invention, with completely opened cover elements (FIG. 9) and completely closed cover elements (FIG. 10).

Line guide device 1 according to FIGS. 1 to 3 is a component, manufactured in one piece by an injection moulding method, that consists of a plurality of links 2, connected to each other in articulated fashion, each of which displays a bottom element 3, two side walls 4, integrally moulded on bottom element 3 and laterally spaced apart in the longitudinal direction of the line guide device, and a cover element 5. The bottom element, cover element and the opposite side walls together form a duct 6 for accommodating lines, which can run in the longitudinal direction of the line guide device. As shown in FIG. 8, the line guide device can be arranged to form a lower run 7, an upper run 9 and a curved section 8 connecting them. At least one of the ends of the line guide device can be fastened to a stationary consumer, and the opposite end to a mobile consumer, such that the line guide device can be moved in the longitudinal direction relative to the stationary end.

In order to permit exact guidance of the lines in the case of links of small dimensions, which can, for example, display a width and/or height of 0.5 to 1 cm, bottom element 3 and the two side walls 4 of the respective links are designed in one piece in the form of U-sections, these being of essentially rigid design, at least under average intended loading. In the case of this kind of essentially rigid design of the U-sections, areas of significantly thinner material or hinge joints are dispensed with in the area of the U-sections, e.g. in the transitional area between the bottom element and one or both of the side walls. Cover elements 5*a*, 5*b* are integrally moulded in one piece on the respective side walls with hinge joints 10, which can particularly be designed as film hinges. In the condition as manufactured in the respective mould, the line guide device can display the arrangement of the cover elements shown in FIGS. 1, 2, without being limited to this. Starting from the open position illustrated in FIG. 1, in which the cross-section of the line guide device is at least partly, or completely, released, cover elements 5*a*, 5*b* can be moved into the closed position shown in FIG. 3, in which the cover elements can be fastened in detachable fashion to the side walls opposite the respective hinge joints 10.

Bottom elements 3 of the links are in each case connected to each other by hinge joints 11, which can be designed as film hinges, forming a continuous, one-piece strip. Alternatively or additionally, joint elements integrally moulded in one piece can, where appropriate, be located between the face ends 12 of adjacent links pointing towards each other, forming a line guide device moulded in one piece with a plurality of links.

As can be seen in FIGS. 1 and 2, two different designs of cover element 5a, 5b are provided, in each case being integrally moulded in one piece on the side walls in alternating fashion and on opposite sides of the line guide device. According to the practical example, the two cover elements 5a, 5b are provided with locking means 13, integrally moulded in one piece in the form of tabs, which can be fixed in place in detachable fashion on the side walls of the respective links opposite hinge joints 10, particularly by means of positive connections, particularly snap-fit connections. In this context, closing elements 13 are essentially immoveable relative to the cover elements, although they can, if necessary, likewise be connected to the associated cover elements by means of hinge joints, e.g. in the form of film hinges. Outer walls 14 of side walls 4 are provided with closing elements 13a in the form of snap-in lugs, which can be connected to the closing elements of the cover elements. Closing elements 13 have to be moved away from outer walls 14 transverse to the line guide device in order to detach them, such that forces of the guided lines acting on the cover elements on the inside do not act on the cover elements in the opening direction of the closing elements. Where appropriate, it may also be sufficient to provide corresponding closing elements only on the cover elements lying on top in closed position, i.e. cover elements 5a according to FIGS. 1 to 3. The closing elements thus preferably act laterally on the side walls of the respective link, i.e. on the inner side or the outer side.

Cover elements 5b of a link thus display projecting areas 15, which project towards at least one, or both, of the adjacent links and, when in closed position, are located between the opposite side walls of the respectively adjacent link. In this context, projecting areas 15 are separated from inner sides 16 of the side walls by a slight lateral clearance, or lie against them. The fact that the cover areas of one link engage the respectively adjacent link stabilises the line guide device against laterally acting forces, which would result in inward or outward bulging of the line guide device relative to the straight position.

The cover elements in each case display hinge joints 10, extending in the longitudinal direction of the line guide device. According to the practical example, the longitudinal extension of the hinge joints corresponds to the length of the links in the longitudinal direction of the line guide device, although they can also display a short length, if appropriate. It goes without saying that the hinge joint can also be interrupted, if appropriate. Furthermore, located on the cover elements are areas 15, which project towards the respectively adjacent link and can overlap cover element 5a of the adjacent link. The overlap can extend to the areas projecting from the hinge joints in the longitudinal direction of the line guide device, or projecting areas 15 of a link can overlap an adjacent link at the level of the joint area thereof. The projecting areas of the respective cover elements are thus in each case designed in the manner of tabs. These tabs can, as with cover elements 5b according to FIG. 2, display a smaller material thickness than the cover element areas at the level of the hinge joints, such that moving the line guide device into a curved position under flexural stressing of the tabs is facilitated, and tab-like projecting areas 17 of the cover elements can, as with cover elements 5a according to the practical example (FIG. 1b), also display essentially the same material thickness as the cover elements. According to the practical example, this particularly applies to the cover element which, when the line guide device is closed, faces away from the respective bottom element, i.e. forms the upper side of the line guide device.

The mutually overlapping, projecting areas 15, 17 of cover elements 5a, 5b furthermore display pairs of corresponding stops, which act in the straight position or in the curved position of the line guide device. The stops of the pairs of corresponding stops of adjacent links are in this instance all located on the respective cover elements, although at least some of them can also be provided on the side walls, if appropriate.

Face ends 19, 20 of cover elements 5a, 5b, which in each case point towards the adjacent element, serve as stops in the straight position. In this context, the face end of a first cover element—in this instance of cover element 5a, which is on top in closed position—which acts as a stop is of curved design, the corresponding face-end stop face of cover element 5b, at least the overlapping area of which is located beneath cover element 5a according to the practical example, being of inwardly curved design. The arc-shaped curves in each case preferably correspond to arcs of a circle. The face ends of cover elements 5a, 5b can preferably be brought into full surface contact with each other in this context. Overlapping areas 15 of cover elements 5b are cranked downwards in the direction of the bottom elements, making it possible to provide an essentially plane upper side of the line guide device, this purpose being served by the upper sides of cover elements 5a and the middle thicker areas 21 of cover elements 5b.

To provide a stop system acting in the curved position of the line guide device, cover elements 5b are designed with projecting areas 15, which are provided with pegs 22 that project transverse, more precisely perpendicular, to the line guide device and are arranged essentially perpendicular to the bottom elements in this instance. Pegs 22, which are designed as snap fasteners, engage a slot 23 of cover element 5a of the adjacent link. According to the practical example, slot 23 of cover elements 5a displays such an extension in the longitudinal direction of the line guide device that stop pegs of both adjacent links can be guided in the slot until the pegs each run up against stop areas 24 limiting slot 23 in the longitudinal direction of the line guide device. To prevent pegs 22, designed as snap fasteners, from jumping out of slots 23 in the curved position of the line guide device, slots 23 are provided with webs (not shown) projecting towards the principal longitudinal plane of the line guide device.

As a result of the fact that areas 17 of the cover elements projecting towards the adjacent link (accordingly also areas 31, 33a of the embodiment according to FIGS. 4-6) engage cover element recesses of the adjacent links and are guided in them in laterally close fashion, i.e. with only little or virtually no clearance, or that cover element areas 15 are located between side walls of the adjacent link and guided between them with little or virtually no clearance, the lateral stability of the line guide device is substantially increased. Cover element areas of a first link are thus laterally in contact, preferably on both sides, with areas of the adjacent link, or come into contact with then under slight lateral forces. Lateral contact exists at least in a partial area at least in the straight position of the device, preferably over the full pivoting angle of the links relative to each other.

The pairs of respectively corresponding stops 19, 20; 22, 24 acting in the straight position and/or in the curved position of the line guide device-are located at the level of principal longitudinal mid-plane E of the line guide device.

For extension of the length of the line guide device by attachment of a further line guide device, e.g. of identical design, fastening elements 25 are provided on the end link as an extension of bottom element 3, these being designed as male fastening elements 25*a* according to the practical example. On the underside of the bottom element, the opposite end link of the line guide device displays corresponding receptacles 25*b* in order to be able to form a positive or non-positive connection, particularly a snap connection. Links 2*b* a distance away from the end link, e.g. all links of the line guide device, are also designed with corresponding receptacles for the male fastening elements on the underside, such that the length of the line guide device can be altered at will by separating adjacent links and the line guide device can be connected to a further line guide device of identical design.

Joint elements 11, moulded in one piece between the links that can be angled relative to each other, are located at the level of the respective bottom elements (FIG. 1*c*). Gaps 30, having roughly the thickness of the side walls, are provided between face ends 12 of the links that face each other. The separation of the face ends of the links by gaps particularly offers advantages as regards the one-piece manufacture of line guide devices extending over more than two links, preferably a plurality, by an injection moulding method, providing essentially rigid links.

Dividing webs 30*a*, integrally moulded on the bottom elements in one piece as partitions for the interior space, are illustrated schematically in FIGS. 1*b*, 3. The dividing webs can be of essentially rigid design.

FIGS. 4 to 6 show a further embodiment of the line guide device according to the invention, which essentially only differs from the first practical example as regards the design of the cover elements. According to this practical example, cover elements 30 of only one kind are provided, one end of which in each case displays a tab-like area 31 that projects towards the adjacent link and is provided with a peg 32 serving as a stop. The opposite end of the cover element 30 displays an area 33, which projects from the level of the hinge joint towards the adjacent link and is provided with a slot 34, in which peg 32 is guided in sliding fashion in the event of angling movement of the line guide device. Projecting area 31, bearing the peg, displays a comparatively small material thickness and can be elastically bent and angled when the line guide device is moved into a curved position. In contrast, projecting area 33 can be of comparatively rigid design. Furthermore, face end 33*a* of one of the projecting areas of the cover element engages a corresponding recess in the adjacent cover element, such that a pair of stops acting in the straight position of the line guide device is provided by face ends 35, 36 of adjacent cover elements making contact. At the same time, when in the straight position, peg 32 can lie against the area of the cover element bordering slot 34, forming a further pair of stops acting in the straight position. In curved position, peg 32 runs up against the opposite end area of slot 34 in cover area 38 bordering slot 34. It goes without saying that, where appropriate and as in the practical example according to FIGS. 1 to 3, the cover area provided with the slot can be designed in the manner of a tab that is elastically deformable in the event of angling of the line guide device, and that the face end of area 31 bearing stop peg 32 can provide a stop acting in the straight position of the line guide device. Furthermore, according to this practical example and also that in FIGS. 1 to 3, both areas 31, 33 projecting towards the adjacent link can be designed to be bendable, preferably elastically bendable, in the event of angling of the line guide device, or both areas can be designed with face-end stop faces.

According to FIG. 7, the bottom plates, or the lower areas of the side walls facing the bottom plates, can be provided with projections 101 protruding towards the adjacent link, which are preferably located below hinge joint 102. The projecting areas constitute stops that act in the curved position of the line guide device and can be brought into contact with opposite areas of the adjacent link. At least one, or both, of stops 103, 104 can in this context display bevelled areas, such that plane stop areas are provided in the curved position of the line guide device.

FIG. 8 shows a practical example of a line guide device according to the invention, which essentially differs from the practical example according to FIGS. 1 to 3 in that cover elements 40 do not display mutually overlapping areas, the front and rear face ends 41, 42 of the cover elements essentially serving as stop faces instead. If appropriate, the face ends can display wider areas in order to enlarge the stop faces.

According to FIG. 8*a*, the end areas of face ends 44 of side walls 45, pointing towards each other and facing integrally moulded joint element 43, can serve as stops in the curved position of the line guide device, i.e. in the curved section thereof.

Consecutive side walls in the longitudinal direction of the line guide device can also display different heights. The side walls having a smaller height are provided with cover elements integrally moulded in one piece via hinge joints, e.g. in the form of film hinges. The cover elements of every second link can display areas projecting towards the two adjacent links, which can serve as stop faces and can come into contact with face ends of the adjacent links in the straight position of the line guide device.

Furthermore, tabs 47, integrally moulded on the outer sides of side walls 45, are shown in FIGS. 8*a*, 8*b*, displaying slots 48 with an arc-shaped curvature, each of which is engaged by a peg 49 of an adjacent link. The tabs make it possible to increase the lateral stability of the device and, in interaction with the pegs, to provide a stop system that limits the pivoting angle of the links in the straight position and/or in the curved position of the line guide device. The tabs can be integrally moulded in one piece on side walls 45 at the position indicated in FIG. 8*b*, e.g. by an injection moulding method, and then moved into the target position illustrated in FIG. 8*a*, to which end the tabs can be connected to the side walls in articulated fashion via hinge joints (not shown).

As an example of the line guide devices according to the invention, their use as an ESD (electronic static discharge) device will be illustrated on the basis of the practical example according to FIG. 8. It goes without saying that the same also applies to the other practical examples, mutatis mutandis. The schematically illustrated end fastening elements 100, which can also have the function of electrical connecting elements that connect the line guide device to the respective consumers 100*a*, at least one of which is moveable, can consist of metal or an ESD-compatible material having corresponding electrical conductivity. In this context, the connecting link is connected by means of a bridging element 103 to the last link 104 of the links located on a continuous bottom element, a connection with sufficient electrical conduction being ensured. The bridging element can be located on the side of the link facing towards and/or away from the bottom element in this context. In this instance, the electrical connection is designed in such a way that the electrical resistance is no greater than if a continuous bottom element 101 had also been used between last link 104 and end fastening element 100. It goes without saying that, alternatively, last link 104, or one of the last links of the line guide device that is in each case connected to a continuous bottom element 101 with a plurality of further links in the longitudinal direction of the line guide device, can also be connected directly to the respective consumer. To this end, the end link of the device can be provided with corresponding fastening devices, in the simplest case through-holes for accommodating fastening elements like screws, that can, for example, be located in the bottom element and/or the wide walls of the links. One or both of the last links 104 can also be provided with a connecting point for an electrical discharge device, e.g. an earth.

In this context, the line guide device itself displays a single bottom element 101, extending over its full length, which connects adjacent links 102 to each other and simultaneously forms the respective links, together with side walls 45. Side walls 45 and bottom element 101 consist of the same material in this context. End fastening elements 101a as connecting elements (pusher and fixed point) are in this context each electrically earthed in accordance with the requirements of EN 61340-5-1. Furthermore, guide trough 105, within which the line guide device can be moved, can be electrically earthed at one or more points. The guide trough, or a corresponding other base for the line guide device, can be manufactured from an electrically conductive material, such as a metal or a plastic with adequate electrical conductivity, and have an integrated electrical discharge device, if appropriate.

In this context, the line guide device is designed in such a way that the total resistance over its length is approx. 8,000 ohms, and that the point-to-point resistance $R_p$ of the line guide device, measured from a point on the first link to a point on the last link of the line guide device which can each be located adjacent to end fastening elements 100, lies in the range from $1 \times 10^4$ to $1 \times 10^{10}$ ohms. In this context, the contact point can in each case be located in the middle of the respective bottom element of the respective link, either on the upper side or on the underside. As a result of this design, electrical charging of the line guide device can be reliably prevented, in which context discharge of the electrical charges takes place over the entire continuous bottom element extending over the length of the line guide device, which provides a continuous electrical conductivity path without interruptions in the material. Furthermore, individual links of the line guide device can be earthed separately, such that, as far as possible, the continuous bottom element at least connects adjacent earthed links spaced apart in the longitudinal direction of the line guide device. The line guide device can, for example, display 50-100 or more links in this context.

If appropriate, sufficient electrical conductivity of the conductivity path can also be achieved here, and also in general, by means of metallic or semiconducting coating of the areas of the line guide device providing the conductivity path, or of the entire line guide device, e.g. by galvanisation or vaporisation.

FIGS. 9, 10 show a further embodiment of line guide device 80, in which cover elements 83, integrally moulded on side walls 82 in one piece by means of hinge joints 81, only partly cover duct 84, bordered by the opposite side walls, with a major part of their longitudinal extension. The cover elements of adjacent links 85 thus display a parting line, located at the level of duct 84, which, according to the practical example, extends in the longitudinal direction of the line guide device and is located at the level of longitudinal midplane E of the line guide device. Cover elements 83 furthermore display, possibly independently of the above-mentioned design, teeth 86, which engage corresponding teeth on the upper side of the side walls opposite the respective hinge area 81. In addition to closing elements 87, this provides fixing of the cover elements on the side walls, in which context the teeth can absorb tensile forces acting in the longitudinal direction, at least in the straight position, and possibly also in the curved position, of the line guide device. If appropriate, fastening means located in sliding fashion on the side walls can be provided on the areas of the cover elements located at the level of the side walls, e.g. guide pegs located in slots in the side walls, in which context the slots can extend in the longitudinal direction of the line guide device.

Independently of the other characteristics above, the cover elements are, referred to the area covering the duct, thus of asymmetrical design relative to the longitudinal mid-plane of the line guide device. In this context, closing elements 87 are fixed in place in snap-in fashion on snap-in projections 88, located on the outer side of the side walls. In the curved position of the line guide device, the cover elements can thus possibly be lifted off each other in the manner of scales. If appropriate, however, connecting means (not shown), such as snap-in webs or the like, can also be located in lateral contact areas 89 of the cover elements, enabling displacement of partial areas of adjacent cover elements in the longitudinal direction of the line guide device, but exerting a certain resistance to separation in a direction perpendicular to the bottom elements. Thus, corresponding receptacles, e.g. in the form of receiving grooves, can be provided on narrow faces 90 of the cover elements facing the duct.

| List of reference numbers | |
|---|---|
| 1 | Line guide device |
| 2 | Link |
| 3 | Bottom element |
| 4 | Side wall |
| 5a, 5b | Cover element |
| 6 | Duct |
| 7 | Bottom run |
| 8 | Curved section |
| 9 | Upper run |
| 10 | Hinge joint |
| 12 | Face end |
| 13 | Closing element |
| 14 | Outer side |
| 15 | Projecting area |
| 16 | Inner side |
| 17 | Projecting area |
| 19 | Face end |
| 20 | Face end |
| 21 | Thicker area |
| 22 | Peg |
| 23 | Slot |

The invention claimed is:

1. Line guide device for guiding lines, comprising a plurality of links, connected to each other in articulated fashion, where at least some, or all, of the links each display a bottom element, opposite side walls and at least one cover element, forming a duct for accommodating lines, where the plurality of links are integrally molded on one another in one piece, forming a continuous strand, and where the line guide device can be arranged to form a lower run, a curved section and an upper run, where the bottom element and both opposite side walls of the links are designed in one piece as U-sections that are essentially rigid under the intended loads, and where the cover element of the respective link is integrally molded on at least one side wall of said link and designed to be moveable relative to the side wall, and can be moved into a position closing the link and a position at least essentially releasing the area between the opposite side walls, characterized in that mutually corresponding stops of adjacent links are provided, which interact in the straight position or curved position or both of the line guide device and are in each case located on the cover elements of the adjacent links or are provided by overlapping areas of adjacent links in the form of tabs, which are integrally molded in one piece on the side walls or cover elements or both of at least some links and, starting from a first position, can be moved into a second position, in which they overlap a partial area of an adjacent link.

2. Line guide device according to claim 1, characterized in that the line guide device is manufactured as a one-piece plastic part.

3. Line guide device according to claim 1, characterized in that a closing means, integrally molded in one piece, is provided on the cover element being connectable in detachable fashion to a corresponding closing means to form a line guide device that is closed on the cover side, where the corresponding closing means is located on the side wall of the respective link, or in that the cover element is of two-part design and the closing element is integrally molded in one piece on the cover element part of the respective link opposite the first cover element part.

4. Line guide device according to claim 1, characterized in that said mutually corresponding stops of adjacent links correspond to each other and come into contact with each other when the line guide device is in the straight position, and in that at least one of said corresponding stops of adjacent links is provided on a cover element or on the inner sides of the side walls facing towards the duct or the outer sides of the side walls facing away from the duct or the upper side of the side wall facing away from the bottom element of the link or a combination of them.

5. Line guide device according to claim 1, characterized in that the stop is designed as an area of the cover element which, in the straight position of the line guide device, projects onto the adjacent link and, in stop position, engages a recess provided with a stop in a cover element of a side wall of the adjacent link.

6. Line guide device according to claim 1, characterized in that the cover elements of the line guide device are designed in such a way that they provide a closed upper side of the line guide device in the straight position of the line guide device.

7. Line guide device according to claim 1, characterized in that the cover elements of the line guide device are designed in such a way that they also provide a closed upper side of the line guide device in the curved position of the line guide device.

8. Line guide device according to claim 1, characterized in that at least some cover elements of the links are provided with at least one integrally molded projecting area, which forms overlapping areas with at least one of the respectively adjacent links in the straight or curved position of the line guide device or both, and in that stop elements acting in stop position are located on the overlapping areas of the respectively adjacent links.

9. Line guide device according to claim 1, characterized in that at least some cover elements are provided on both sides with integrally molded projecting areas, which project towards both adjacent links and in each case overlap the cover element of the adjacent links, or projecting areas projecting from the adjacent cover elements towards the respective link.

10. Line guide device according to claim 1, characterized in that the stop is designed as a peg projecting from the respectively overlapping area transverse to the longitudinal direction of the line guide device, and in that the respectively corresponding stop displays a recess receiving the peg, in which the peg is accommodated over at least part, or all, of the pivoting movement of adjacent links relative to each other.

11. Line guide device according to claim 1, characterized in that, in the straight position of the line guide device, the face ends of the side walls of respectively adjacent links that face each other are spaced apart from each other, at least over part, or all, of their height.

12. Line guide device according to claim 1, characterized in that the bottom element or the side wall of at least one, or both, of the respectively adjacent links is provided with a projection, which projects onto the adjacent link and, in the curved position of the line guide device, can be brought into contact with an opposite area of the adjacent link.

13. Line guide device according to claim 1, characterized in that fastening elements corresponding to each other are integrally molded in one piece on the ends of the line guide device, by means of which the line guide device can be assembled to a line guide device of identical design, extending the length of the same.

14. Line guide device according to claim 13, characterized in that at least one fastening element is provided on one end thereof, and corresponding fastening elements are provided on several or all links of the line guide device, these being connectable to each other, at least after adjusting the length of the line guide device.

15. Line guide device according to claim 1, characterized in that, on at least some links, at least one dividing web is provided between opposite side walls of the link, which acts as a partition for the interior space and is connected to the bottom element in one piece.

16. Line guide device according to claim 1, characterized in that at least some cover elements of the links engage at least one, or both, of the adjacent links and are located with an area between opposite side walls of the respectively adjacent link, and in that the area located between the side walls displays a width essentially corresponding to the distance between the side walls.

17. Line guide device according to claim 1, characterized in that the line guide device displays, over at least essentially the length of the bottom element interconnecting several links, or over a distance in the longitudinal direction of the line guide device between two adjacent links that are earthed or provided with an earthing device, which are preferably connected to each other via a continuous bottom element, or over the full length of the line guide device, an electrical resistance R of approx. 20,000 ohms or less.

18. Line guide device according to claim 1, characterized in that the line guide device displays, over at least essentially the length of a continuous bottom element interconnecting several links, or over a distance in the longitudinal direction of the line guide device between two adjacent links that are earthed or provided with an earthing device, which are preferably connected to each other via the continuous bottom element, or over the full length of the line guide device, an electrical surface resistance $R_s$ or an end-to-end resistance $R_e$ or a point-to-point resistance $R_p$ of $\leq 1 \times 10^{10}$ ohms.

19. Line guide device according to claim 1, characterized in that the line guide device displays, over at least essentially the length of a continuous bottom element interconnecting several links, or over a distance in the longitudinal direction of the line guide device between two adjacent links that are earthed or provided with an earthing device, which are preferably connected to each other via the continuous bottom element, or over the full length of the line guide device, an electrical resistance of $R_g \leq 1 \times 10^{12}$ ohms to an EPA earthing point connected to the line guide device, or to an EPA earthing device connected to the line guide device.

* * * * *

UNITED STATES PATENT AND TRADEMARK OFFICE
CERTIFICATE OF CORRECTION

| | |
|---|---|
| PATENT NO. | : 7,718,894 B2 |
| APPLICATION NO. | : 10/576234 |
| DATED | : May 18, 2010 |
| INVENTOR(S) | : Frank Blase |

It is certified that error appears in the above-identified patent and that said Letters Patent is hereby corrected as shown below:

On the title page, in item (22), after "PCT Filed:" delete "Oct. 10, 2004" and insert -- Oct. 14, 2004 --, therefor.

Signed and Sealed this

Twenty-eighth Day of September, 2010

David J. Kappos
*Director of the United States Patent and Trademark Office*